No. 710,471. Patented Oct. 7, 1902.
G. KLAY.
CREAM SEPARATOR.
(Application filed Feb. 5, 1902.)
(No Model.)
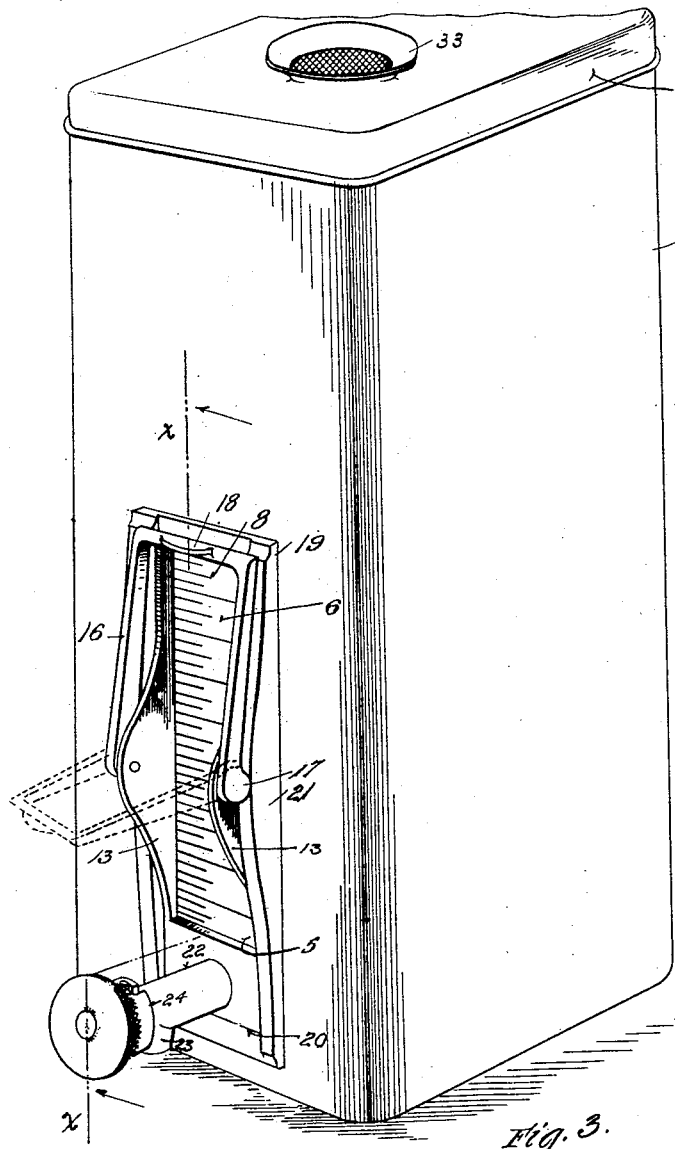
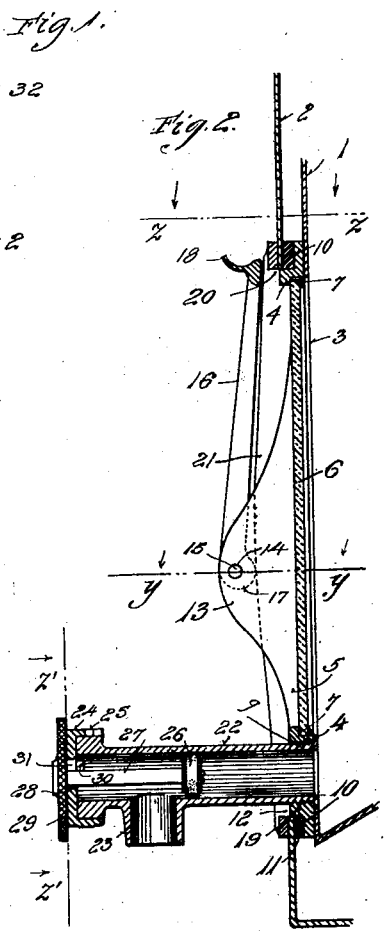
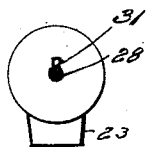
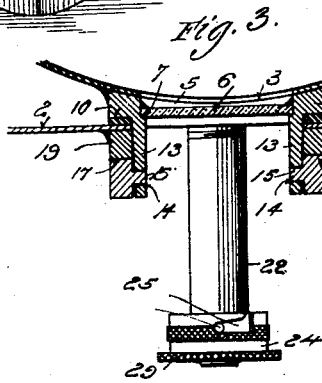
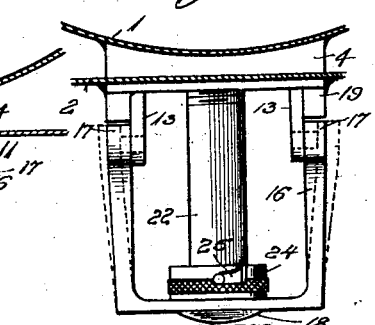
WITNESSES: INVENTOR.
*Gideon Klay*
BY
*H. A. Toulmin*
ATTORNEY.

UNITED STATES PATENT OFFICE.

GIDEON KLAY, OF BLUFFTON, OHIO, ASSIGNOR TO PETER DILLER, OF BLUFFTON, OHIO.

CREAM-SEPARATOR.

SPECIFICATION forming part of Letters Patent No. 710,471, dated October 7, 1902.

Application filed February 5, 1902. Serial No. 92,629. (No model.)

*To all whom it may concern:*

Be it known that I, GIDEON KLAY, a citizen of the United States, residing at Bluffton, in the county of Allen and State of Ohio, have invented certain new and useful Improvements in Cream-Separators, of which the following is a specification, reference being had therein to the accompanying drawings.

This invention relates to cream-separators, and more particularly to that class comprising an inner vessel to contain the milk and cream and an outer vessel to contain the water used for cooling, the two being detachably connected and the inner vessel being provided with a glazed sight-opening visible from the exterior of the two cans and with a cock or faucet similarly accessible.

The object of my present invention is to provide means whereby the two cans may be readily connected and disconnected and also to provide certain improvements in the cock or faucet whereby the same may have a comparatively large discharge with a comparatively small maximum diameter to facilitate the separation of the cans without the removal of the faucet, said faucet being further particularly constructed with a view to the ready cleaning of the same and being provided with means whereby it may be locked in a closed position.

To these ends my invention consists in certain novel features, which I will now proceed to describe and will then particularly point out in the claims.

In the accompanying drawings, Figure 1 is a perspective view of a separator embodying my invention in one form. Fig. 2 is a vertical sectional view through a portion of the same, taken on the line $x\,x$ of Fig. 1. Fig. 3 is a detail plan section taken on the line $y\,y$ of Fig. 2. Fig. 4 is a detail plan section taken on the line $z\,z$ of Fig. 2, and Fig. 5 is a detail sectional view taken on the line $z'\,z'$ of Fig. 2 and looking in the direction of the arrows.

In the said drawings, 1 indicates the inner or milk vessel, and 2 the outer or water vessel inclosing the former. The vessel 1 is provided with an opening 3 in its side, and on the outer face of the wall of said vessel surrounding said opening there is secured one member 4 of the connecting device by means of which the two vessels are secured together. This member is soldered or otherwise secured to the outer face of the can around the margin of the opening 3 and is itself provided with an opening 5, closed by a pane of glass 6 or other suitable transparent material. The member 4 is provided in its rear face with a rabbeted seat 7, in which the glass is fitted and secured in any suitable manner. I prefer to provide the face of the glass with a scale 8, cut or etched thereon or otherwise produced thereon in any suitable manner. The opening 5 does not extend quite to the bottom of the member 4, and in the lower portion of said member below the opening I form a threaded aperture 9 to receive the faucet, hereinafter more particularly described. The member 4 is provided around the margin of its inner face with a seat 10 to receive a gasket 11, and the portion of the body of said member lying outward from said seat is adapted to extend out through an opening 12 in the outer can or vessel and is provided with outwardly-projecting lateral flanges 13. These flanges are provided with apertures 14, which form bearings for the journals 15 of a cam-yoke 16, which is thus pivotally connected to the inner member of the connecting device. This cam-yoke is provided with locking-cams 17 at its pivoted extremities and with a finger piece or grasp 18, by means of which it may be more readily operated. It is, moreover, so constructed that its pivoted ends may be sprung apart or separated, as indicated in dotted lines in Fig. 4, so as to detach it from the member 4.

The outer member of the connecting device consists of a metallic frame 19, soldered or otherwise suitably secured to the outer can 2, around the margin of the opening 12 therein, and itself provided with a corresponding opening 20, into which the body portion of the inner member 4 projects and fits. The lateral portions 21 of this outer member form surfaces upon which the cams 17 of the cam-yoke 16 may bear, as indicated in the several figures of the drawings.

It will be seen that when the parts are assembled in the manner shown and the cam-yoke is turned up into the position shown in full lines in Figs. 1 and 2 the cams 17 will bear against the outer member 19 and will draw the two members 4 and 19 together, compressing between them the gasket 11, so as to form a water-tight connection between the two cams. It will also be seen that by swinging the cam-yoke down into the position indicated in dotted lines in Fig. 1 and in full lines in Fig. 4 the two members of the connecting device are permitted to separate and the cams are no longer clamped together. By springing the pivots of the cam-yoke out of the apertures in the flanges 13, as indicated in dotted lines in Fig. 4, the said yoke may be readily removed, whereupon the cans may be separated in an obvious manner. Heretofore, so far as I am aware, the members of the connecting device have been united either by screws or by screw-threaded connections, which require considerable time to effect the union and separation of the cans and which are difficult to clean, whereas my improved connecting device is exceedingly rapid in action, simple, and effective and all parts of it are readily accessible for cleaning purposes.

The cock or faucet which I prefer to employ in connection with the inner vessel is that shown, and it consists of a straight cylindrical barrel or body portion 22 of equal internal diameter from end to end and having a downwardly-directed discharge branch 23 at right angles thereto and of an internal diameter equal to that of the main body 22. The barrel or body 22 is provided at its outer end with a cap 24, removably secured thereon, preferably by a bayonet-joint, as indicated at 25. Within the barrel 22 fits a piston 26, having a stem 27, which passes out through an opening 28 in the cap 24 and is provided at its outer extremity with a milled head or finger-grasp 29, by means of which it may be readily operated. The rod or stem 27 is provided with a pin 30, projecting radially therefrom some little distance inward from the head 29, and the cap 24 is provided with a corresponding radial notch 31, extending outward from the aperture 28.

It will be seen that when the piston 26 is in the position indicated in Fig. 2 the cock is closed and nothing can flow from the inner vessel. The head 29 being turned so that the pin 30 registers with the notch 31, the piston 22 can be drawn outward until it is outwardly beyond the discharge-opening 23, whereupon the milk or cream may be discharged from the inner vessel. By the employment of this piston-valve I am enabled to make the discharge-outlet as large as the passage through the barrel or body of the faucet without in any way increasing the total external diameter of the faucet, and this is a desirable feature, for the reason that the faucet is usually withdrawn through the opening in the outer vessel when it is desired to remove the inner vessel. By removing the cap 24 the piston 22 can be entirely withdrawn from the barrel of the faucet, and this latter may then be readily cleaned by passing a suitable swab through the same, this cleaning operation being effectual, for the reason that the internal diameter of the barrel is the same throughout and no shoulders, recesses, or projections are present. Moreover, by the use of a piston-valve I am enabled to employ a comparatively simple connecting device between the cap and barrel—such, for instance, as the bayonet-joint—since there is no danger of leakage between the cap and barrel, the piston-valve preventing access of the fluid to their point of union. The pin 30 and notched cap form a simple and efficient locking device which prevents accidental opening of the faucet and also in a great measure prevents its being intentionally opened by children or unauthorized persons. It will also be noted in this connection that the use of this locking device is rendered possible by the piston-valve, which cuts off the fluid from the notched cap.

I have shown the outer vessel 1 as provided with a suitable cover 32 and strainer or ventilator 33. I have also shown the outer vessel as angular in form; but it is obvious that it may be of any suitable shape. It is also obvious that various modifications may be made without departing from the principle of my invention, and I therefore do not wish to be understood as limiting myself strictly to the precise details hereinbefore described, and shown in the accompanying drawings.

I make no claim in the present application to the faucet construction herein shown and described, as the same forms the subject-matter of a separate application filed by me August 15, 1902, Serial No. 119,713.

Having thus fully described my invention, what I claim as new, and desire to secure by Letters Patent, is—

1. A cream-separator comprising inner and outer vessels having registering openings, and a separable connecting device for said vessels, comprising an inner member secured to the inner vessel and surrounding the opening thereof, said inner member having a part projecting through the opening of the outer vessel, and a yoke detachably pivoted to said projecting part externally of said outer vessel, said yoke having terminal cams of increasing radius, said separable connecting device also comprising an outer member surrounding the opening of the outer vessel on the outside thereof between it and the yoke and having bearing-surfaces to coact with the cams of the yoke, and a suitable gasket or packing interposed between the separable connecting device and the outer vessel, substantially as described.

2. A cream-separator comprising inner and outer vessels having registering openings, and a separable connecting device for said vessels, comprising an inner member secured to the inner vessel, surrounding the opening thereof and provided with a glazed sight-opening, said inner member having projections extending outward through the opening of the outer vessel and having a yoke detachably pivoted to said projections externally of said outer vessel, said yoke having terminal cams of increasing radius, said inner member also having a faucet projecting through the opening of the outer vessel, said separable connecting device also comprising an outer member surrounding the opening of the outer vessel on the outside thereof between it and the yoke, and having bearing-surfaces to coact with the cams of the yoke, and a suitable gasket or packing interposed between the separable connecting device and the outer vessel, substantially as described.

3. A cream-separator comprising inner and outer vessels having registering openings, and a separable connecting device for said vessels, comprising an inner member secured to the outside of the inner vessel, surrounding the opening thereof and provided with a glazed sight-opening, said inner member having parallel flanges extending outward through the opening of the outer vessel and provided with bearing-apertures, and a resilient yoke provided with cams of increasing radius and with journals to detachably engage the apertures of the flanges, said yoke being located outside of the outer vessel, said inner member being also provided with a faucet extending through the opening of the outer vessel, said separable connecting device also comprising an outer member surrounding the opening of the outer vessel on the outside thereof between it and the yoke, and having bearing-surfaces to coact with the cams of the yoke, and a gasket interposed between the separable connecting device and the outer vessel, substantially as described.

In testimony whereof I affix my signature in presence of two witnesses.

GIDEON KLAY.

Witnesses:
   JOHN J. KLAY,
   CHRISTIAN KLAY.